United States Patent Office 3,409,556
Patented Nov. 5, 1968

3,409,556
PHOTOCHROMIC COMPOSITION AND SUBSTRATE
COATED THEREWITH
George E. Bruner, Wilton, and John Christos Petropoulos,
Norwalk, Conn., assignors to American Cyanamid Company, Stamford, Conn., a corporation of Maine
No Drawing. Filed Jan. 4, 1966, Ser. No. 518,546
10 Claims. (Cl. 252—300)

ABSTRACT OF THE DISCLOSURE

This invention relates to novel photochromic compositions of matter and substrates coated therewith, said compositions of matter composed of an hydroxy-containing polymeric material, an aminoplast cross-linking agent and a transition metal compound having the formula (I) $\qquad MX_mO_n(OR)_p$ wherein M is a transition metal, X is a halide, R is an alkyl radical having from 1–12 carbon atoms, inclusive, an aryl radical having from 6–10 carbon atoms, inclusive, or a

radical, $R^1$ is an alkyl radical having from 1–12 carbon atoms, inclusive, or an aryl radical having from 6–10 carbon atoms, inclusive, m is a whole, positive integer of from 1–6 inclusive, p is a whole positive integer of from 0–5, and n is a whole, positive integer of from 0–2, inclusive, the total of $2n+m+p$ being equal to the valence of the metal M.

---

U.S. patent application, Ser. No. 339,073 filed Sept. 24, 1964, discloses compositions composed of a polymeric material and a transition metal compound of the type represented by Formula I, above. The application discloses that the polymeric component, or its solvent if in solution, must contain oxygen in order to assure that the complete composition exhibit photochromic properties when contacted with ultra-violet light.

We have now discovered that compositions similar to those of said application, the subject matter of which is incorporated herein by reference, can be prepared. We use, however, an hydroxyl group-containing organic polymer and an aminoplast cross-linking agent in combination with the transition metal compound. Our compounds when coated on a siliceous substrate, form a hard, cross-linked coating which, as a whole, constitutes a variable transmission device. That is to say, we have found that we can produce a composition which may be coated onto a siliceous substrate, such as glass etc., and allowed to cross-link at room temperature to produce a coating which functions photochromically upon contact with ultraviolet light.

This improved composition can therefore be used much in the same manner as other known coating compositions such as paints, etc. i.e. it can be brushed, sprayed, etc. to coat window glass, automobile windshields, eye glass lenses, and the like. In this manner, the coated substrate, when contacted with ultraviolet light, changes color and materially inhibits the passage of light therethrough, thereby enabling the wearer of the glasses, the driver of the automobile, etc. to be shielded from the rays and the glare of the sun or other ultraviolet sources. The final article also has the ability to absorb infra-red and thereby enables the compositions to be used in many other applications.

It is therefore an object of the present invention to provide novel compositions of matter and articles of manufacture produced therefrom.

It is a further object of the present invention to provide novel compositions of matter comprising an hydroxy-containing polymer, an aminoplast cross-linking agent and a transition metal compound represented by Formula I, above.

These and other objects of the present invention will become more apparent to one skilled in the art upon reading the more detailed description set forth hereinbelow.

As mentioned above, we have discovered novel coating compositions which can be produced by blending an hydroxy-containing polymer, a transition metal compound represented by Formula I, above, and an aminoplast cross-linking agent together. The resultant material may be coated on a siliceous substrate and thereby render said substrate photochromic.

Any resinous material which contains chemically active hydroxy groups may be utilized as the first component of our novel compositions. That is to say, any polymeric material, synthetic or naturally occurring, which contains at least two, and preferably a plurality, of available hydroxy groups may be used in the compositions claimed hereinbelow.

While not wishing to be bound by any particular theory or speculation, it is thought that the chemically available hydroxy groups of the polymer, upon combination of the polymer with the transition metal halide, react with the halogen thereof to liberate the halo acid. The resultant acid then catalyzes a reaction between the added cross-linking agent, i.e. the aminoplast resin, and the polymer transition metal system to form a hard, cross-linked material which is photochromic and also has excellent adhesive and surface properties. The attractive feature of this composition is that all the above reactions occur substantially spontaneously at room temperature, and the coating composition can therefore be formed from the different reactant materials at the site of its intended use and be applied at room temperature without the use of extraneous catalysts, heat etc.

It is preferred that the hydroxy-containing polymers used to produce our novel compositions have a hydroxyl number of at least 25. Although polymers of lower hydroxyl numbers may be useful, best results are obtained using these preferred materials.

Examples of hydroxy-containing polymers which may be used herein include the acrylates, i.e. those acrylic or methacrylic polymers which are formed as copolymers of the acrylic monomer with one or more hydroxy containing monomers, e.g. β-hydroxy ethyl acrylate or methacrylate, allyl alcohol, vinyl alcohol, aldehydes, N-methylol acrylamide and the like. Examples of acrylic or methacrylic monomers include ethyl acrylate, methyl methacrylate, t-butyl acrylate and the like.

We may also use copolymers produced by copolymerizing any other well known vinyl monomer such as the styrenes, i.e. styrene, p-chlorostyrene, α-methyl styrene, etc.; acrylonitrile, methacrylonitrile; vinyl halides such as vinyl chloride; vinyl acetate and the like, with any hydroxy-containing monomer with which the vinyl monomer is copolymerizable. Examples of such copolymers include copolymers of styrene and allyl alcohol; copolymers of acrylonitrile and β-hydroxyethyl acrylate; copolymers of vinyl acetate and vinyl alcohol and the like.

Furthermore, naturally occurring and synthetic cellulosic polymers may be used herein such as cellulose acetate butyrate, cellulose triacetate and the like.

A preferred group of hydroxy-containing polymers which we may use to form our novel compositions are the polyester resins, i.e. the alkyd resins also having an hydroxyl number at least about 25. These polyesters include those produced from saturated or α,β-ethylenically unsaturated polycarboxylic acids and saturated or unsaturated polyhydric alcohols wherein the reactants are contacted with an excess of the alcohol component until a polyester having an hydroxyl number of at least that set forth above is formed. Among the alcohols which may be employed are ethylene glycol, propylene glycol, dimethylene glycol, tetramethylene glycol, butylene glycol, diethylene glycol, dipropylene glycol, pinacol, triethylene glycol, tetraethylene glycol, butanediol-1,2, dulcitol, butanediol-1,3, butanediol-1,4, pentanediol-1,2, pentanediol-1,3, pentanediol-1,4, pentanediol-1,5, hexanediol-1,2, hexanediol-1,3, hexanediol-1,4, hexanediol-1,5, hexanediol-1,6, neopentyl glycol, glycerol, trimethylol ethane, trimethylol propane, pentaerythritol, dipentaerythritol, arabitol, xylitol, dulcitol, adonitol, sorbitol, mannitol, and the like, as well as mixtures thereof. Acids which may be used include oxalic, malonic, succinic, glutaric, adipic, pimelic, suberic, azelaic, sebacic, malic, tartaric, tricarballylic, citric, phthalic, isophthalic, terephthalic, cyclohexanedicarboxylic, endomethylenetetra-hydrophthalic, maleic, fumaric, itaconic, citraconic and the like, as well as mixtures thereof.

Further details pertaining to the preparation of polyester resins of the types employed in the practice of the present invention are disclosed in U.S. Patent No. 2,255,313 to Ellis, and U.S. Patent Nos. 2,443,735 to 2,443,741, inclusive, to Kropa, and these patents are hereby incorporated into the present application by reference.

An even more preferred class of hydroxy-containing polymeric materials useful in producing the compositions of the present invention are the oil modified alkyd resins such as those disclosed in one or more of the following U.S. Patents No. 2,618,617, No. 2,648,642, No. 2,649,423 which patents are hereby incorporated herein by reference.

Specifically, these oil modified alkyd resins are composed of any of the saturated or unsaturated polycarboxylic acid-polyhydric alcohol reaction products, preferably having a high hydroxyl number, disclosed above, which are modified by the use of oils, oil acid esters or oil acids of the drying, semidrying or nondrying oil classes.

In the preparation of the oil modified alkyds to be used in the instant invention, one may use such oils as castor oil, linseed oil, chaulmoogra oil, cherry kernel oil, cod liver oil, corn oil, hemp seed oil, grape seed oil, hazel nut oil, candlenut oil, lard oil, soya oil, coconut oil, cottonseed oil, tung oil, perilla oil, oiticica oil, fish oil, olive oil, peach kernel oil, peanut oil, pistachio nut oil, rape seed oil, and the like.

Additionally, we may utilize such hydroxy-containing polymeric materials as the polyurethanes, i.e. isocyanate-alcohol reaction products. Additionally, any polyester based polyurethane resin may be used to prepare the compositions of the present invention. One class of polyurethane resins which may be used herein is produced by reacting a suitable isocyanate compound, with a polyalkylene ether, thioether, or ether-thioether glycol represented by the general formula (II) $\qquad HO-(R^2Y^1)_z-H$ wherein $R^2$ represents the same or different alkylene radicals containing up to about 10 carbon atoms, Y represents oxygen or sulfur, and $z$ is an integer large enough so that the molecular weight of the polyalkylene ether, thioether, or ether-thioether glycol is at least about 500, e.g., from about 500 to about 10,000. The polyalkylene ether glycols included within this general formula include polyethylene glycols, polypropylene glycols, polybutylene glycols, polytetramethylene glycols, polyhexamethylene glycols, and the like, which are obtained, for example, by acid-catalyzed condensation of the corresponding monomeric glycols or by the condensation of lower alkylene oxides, such as ethylene oxide, propylene oxide, and the like, either with themselves or with glycols such as ethylene glycol, propylene glycol, and the like.

Polyalkylenearylene ether, thioether and ether-thioether glycols which also have molecular weights ranging from about 500 to about 10,000 but which differ from the above-described polyalkylene glycols in having arylene radicals, such as phenylene, naphthylene and anthrylene radicals, either unsubstituted or substituted, e.g., with alkyl or aryl groups, and the like, in place of some of the alkylene radicals of said polyalkylene glycols may also be employed to form polyurethanes useful herein. Polyalkylenearylene glycols of the type ordinarily used for this purpose will usually contain at least one alkylene ether radical having a molecular weight of about 500 for each arylene radical present.

The essentially linear polyesters, i.e. those disclosed above, when used in preparing polyurethane resins should have molecular weights ranging from about 750 to about 3,000. When preparing these polyesters, an excess of polyol over polycarboxylic acid is generally used to insure that the resulting polyester chains contain a sufficient amount of reactive hydroxyl groups to react both with the isocyanate and the metal halide.

The polyurethane resins may be prepared using a wide variety of organic polyisocyanates, among which there are included aromatic diisocyanates, such as m-phenylenediisocyanate, p-phenylenediisocyanate, 4-t-butyl-m-phenylenediisocyanate, 4-methoxy-m-phenylenediisocyanate, 4-phenoxy-m-phenylenediisocyanate, 4-chloro-m-phenylenediisocyanate, toluenediisocyanates (either as a mixture of isomers, e.g., the commercially available mixture of 80% 2,4-toluenediisocyanate and 20% 2,6-toluenediisocyanate, or as the individual isomers themselves), m-xylylenediisocyanate, p-xylylenediisocyanate, cumene-2,4-diisocyanate, durenediisocyanate, 1,4-naphthylenediisocyanate, 1,5-naphthylene diisocyanate, 1,8-naphthylene-diisocyanate, 2,6-naphthylene-diisocyanate, 1,5-tetrahydronaphthylene-diisocyanate, p,p'-dihpenyldiisocyanate, diphenylmethane-4,4'-diisocyanate, 2,4-diphenylhexane-1,6-diisocyanate, "bitolylenediisocyanate" (3,3'-dimethyl-4,4'-biphenylene-diisocyanate), "dianisidine-diisocyanate" (3,3'-dimethoxy-4,4'-biphenylenediisocyanate), and polymethylenepolyisocyanates represented by the general formula

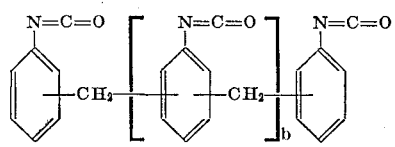

wherein $b$ represents an integer between 0 and about 5 and the like; aliphatic diisocyanates, such as methylenediisocyanate, ethylenediisocyanate, the tri-, tetra-, penta-, hexa-, hepta-, oct-, non- and decamethylene-ω,ω'-diisocyanates, 2-chlorotrimethylenediisocyanate, 2,3-dimethyltetramethylenediisocyanate, and the like, and tri- and higher isocyanates, such as benzene-1,3,5-triisocyanate, toluene-2,4,6-triisocyanate, diphenyl-2,4,4' - triisocyanate, triphenylmethane-4,4',4''-triisocyanate, and the like. Mixtures of two or more of such organic polyisocyanates may also be employed to prepare the polyurethane resins by reaction with the ethers and esters described above utilizing procedures well known to those skilled in the art, see for example, U.S. Patents 2,729,618, 3,016,364 and the like.

Further examples of hydroxy-containing polymeric materials which may be used to produce our novel compositions of matter include the epoxy resins produced by the reaction of an epoxy compound with a dihydric phenol to give glycidyl ethers. The most common epoxy compound used to make these resins is epichlorohydrin. Examples of the dihydric phenols which may be used are the bisphenols, catechol, resorcinol, hydroquinone, pyrogallol, phloroglucinol and the like.

Of the many possible epoxy resins, the most common are the reaction products of epichlorohydrin and Bisphenol A in the presence of alkali to yield linear polymers. The molecular weight of these solid epoxy resins usually lies between about 450 and 4,000.

Epoxy resin esters may also be used to produce our novel compositions of matter. The epoxy esters are the reaction products of epoxy resins described above with fatty or rosin acids under the influence of heat.

The second critical component of our novel compositions is the transition metal halides represented by Formula I, above. These halides, as mentioned above, are believed to react with the hydroxy-containing polymer, to split off a halo acid which then catalyzes the cross-linking reaction between the resultant product and the aminoplast resin. The metal halide may be used in the compositions in concentrations ranging from about 2.5% to about 20%, by weight, based on the total resin solids in the system, i.e. those of the hydroxy polymer and the aminoplast cross-linking resin.

Examples of transition metal halides which may be utilized in producing the compositions of matter of the present invention include titanium tetrachloride, titanium oxide dichloride, zirconium tetrachloride, zirconium oxide dichloride, tungsten hexachloride, tungsten oxide tetrachloride, tungsten dioxide dichloride, hafnium tetrachloride, hafnium oxide dichloride, tantalum pentachloride, tantalum oxide trichloride, tantalum dioxide chloride, titanium tetrabromide, titanium oxide dibromide, zirconium tetrabromide, zirconium oxide dibromide, tungsten hexabromide, tungsten oxide tetrabromide, tungsten dioxide dibromide, hafnium tetrabromide, hafnium oxide dibromide, tantalum pentabromide, tantalum oxide tribromide, tantalum dioxide bromide, titanium tetraiodide, titanium oxide diiodide, zirconium tetraiodide, zirconium oxide diiodide, tungsten hexaiodide, tungsten oxide tetraiodide, tungsten dioxide diiodide, hafnium tetraiodide, hafnium oxide diiodide, tantalum pentaiodide, tantalum oxide triiodide, tantalum dioxide iodide, titanium tetrafluoride, titanium oxide difluoride, zirconium tetrafluoride, zirconium oxide difluoride, tungsten hexafluoride, tungsten oxide tetrafluoride, tungsten dioxide difluoride, hafnium tetrafluoride, hafnium oxide difluoride, tantalum pentafluoride, tantalum oxide trifluoride, tantalum dioxide fluoride, chromium dioxide dichloride, vanadium oxide trichloride, vanadium oxide triiodide, vanadium dioxide bromide, titanium dichloride dimethoxide, titanium trichloride ethoxide, titanium chloride trimethoxide, zirconium dibromide diethoxide, zirconium trifluoride butoxide, zirconium iodide trimethoxide, hafnium dibromide divalerate, hafnium trifluoride laurate, hafnium chloride triphenoxide, tantalum dichloride triethoxide, tantalum tetrabromide acetate, tantalum bromide tetraphenoxide, tantalum trifluoride dimethoxide, tungsten pentachloride methoxide, tungsten tetrabromide bis(p-toluate), tungsten triiodide tris(p-tolyloxide), tungsten dichloride tetravalerate, tungsten bromide penta(1-naphthoate) and the like and the corresponding niobium compounds.

The transition metal compounds listed above are all well known in the art and may be produced by any equally well known procedure. Examples of applicable methods for the production thereof appear in at least one of the following articles: Razivaer et al., Tetrahedron 6, 159, (1959); Sandho et al., Current Sci. (Ind.) 29, 222 (1960); Rosenheim, Ch. Nernst. Z. Anorg. Chem. 214, 220 (1933); Bradley et al., J. Chem. Soc. (1953), 1634, and these references are hereby incorporated herein by reference.

The third critical component in our novel compositions as mentioned above, is an aminoplast resin cross-linking agent. These aminoplast resins are well-known to those skilled in the art and generally include those materials produced by reacting an aldehyde with an aldehyde-reactable amidogen compound. Materials of this type are more fully set forth in U.S. Patent Nos. 2,851,429 and 2,860,119, which patents are hereby incorporated herein by reference. The aminoplast resins are generally produced by reacting a triazine containing one or more amino, imino or amido groups containing one or more reactive hydrogens with an aldehyde or aldehyde mixture. Examples of said triazines include melamine, formoguanamine, mono-amino-1,3,5-triazine, ammeline, ammelide, melam, melem, halogenated compounds such as mono-chlorodiamino - 1,3,5 - triazine (obtainable from cyanuric chloride) hydrocarbon substituted triazines, such as phenyl-diamino-1,3,5-triazine, monomethyldiamino-1,3,5-triazine, triazines containing substituted amino groups, such as 2,4,6-triethyl-triamino-1,3,5-triazine, or 2,4,6-triphenyl-triamino triazine, and the like. Any one or more of the class of triazines described hereinabove and hereinafter, may be reacted with any one or more aldehydes, such as formaldehyde, acetaldehyde, benzaldehyde, crotonaldehyde, furfural, and the like, in aqueous or organic solvents, to produce the aminoplast resins.

Suitable mole ratios between a triazine and an aldehyde are determined by the number of aldehyde reactive hydrogens on the triazine and the degree of reaction desired. Thus, 1 mole of aldehyde for each such reactive hydrogen is normally employed, though a smaller amount of aldehyde may be employed in special cases. Larger amounts, for example, 2 or 3 and more moles of aldehyde per reactive hydrogen, have been successfully employed. Thus, for example, if it is desired to fully methylolate melamine, a minimum of 6 moles of formaldehyde per mole of melamine is required.

These triazine-aldehyde reaction products may be used as such or may be further reacted with saturated aliphatic alcohols containing from between 1 and 8 carbon atoms to also provide suitable useful alkylated derivatives. The alkylated derivatives are generally preferred herein over the unalkylated type compounds, in that they are generally more compatible, in conventional solvent mediums, with the other components used to produce the compositions of the present invention. In this connection, up to 6 moles of the suitable alcohol may be combined, as in the case of hexamethoxyhexamethylol melamine. Examples of methods of producing these alkylated alkylol melamines are set forth in U.S. Patent Nos. 2,918,-452, 2,998,410 and 2,998,411, which patents are also incorporated herein by reference.

Another large and suitable class of triazines useful in the composition of the present invention are diamino triazines and substituted derivatives thereof. These diamino triazines, generally referred to as guanamines and substituted guanamines, and derivatives thereof, include, by way of example, benzoguanamine, formoguanamine, acetoguanamine, various aliphatic substituted guanamines, such as those disclosed in U.S. Patent No. 2,394,526, cyanoaceto guanamine, 2-(4-ethyl-4-ethyl-2-cyano) octanoguanamine, β-ethoxy propionoguanamine, β-amyl oxy propionoguanamine, β-carboxy amyl oxy propionoguanamine, lactoguanamine, levulinoguanamine, β-carboxy methoxy propionoguanamine, various alkoxy alkyl guanamines, such as, for example, those disclosed in U.S. Patent No. 2,491,658 and, more specifically, 4,6-diamino-2-(ethoxy methoxy) methyl-1,3,5-triazine;
4,6-diamino-2-(isobutoxy methoxy) methyl-1,3,5-triazine;
4,6-diamino-2-(tertiary butoxy) methyl-1,3,5-triazine;
6-(propoxy methoxy ethyl)-2,4-diamino-S-triazine;
6-(isopropoxy methoxy ethyl)-2,4-diamino-S-triazine;
6-(butoxy methoxy ethyl)-2,4-diamino-S-triazine;
6-(propoxy methoxy methyl)-2,4-diamino triazine;
6-(1,1'-dimethyl-2,4-dioxaheptyl)-2,4-diamino-S-triazine;
6,6-(tertiary butoxymethyl)-2,4-diamino-S-triazine;
6-(tertiary butoxy ethyl)-2,4-diamino-S-triazine.

We may also use the alkylated derivatives of the guanamines such as those set forth in the U.S. Patent No. 3,207,715. Urea-aldehyde reaction products and their alkylated derivatives may also be employed in the present invention. Examples of the same include urea per se, thiourea, various cyclic ureas, such as ethylene urea, propylene urea, 1,2-propylene urea, and the like. The formaldehyde reaction products of these compounds and their alkylated derivatives as, for example, dimethylated dimethylol urea, may be employed, singly or in combination with one another or with one or more of the various triazines of the type illustrated hereinabove.

The aminoplast cross-linking agents which are employed in our novel compositions may be used in amounts ranging from about 5% to 50%, by weight, based on the total resin solids in the final composition.

An alternative fourth component which may or may not be present in our novel compositions, although its use is preferred, is an aliphatic alcohol such as methanol, ethanol, propanol, butanol and the like. These materials are solvents and are used to stabilize the ultimate composition before its ultimate use by equilibrating the reaction between the cross-linking aminoplast resin and the hydroxy-containing polymer in the solution. When the total solution is then applied to a self-supporting substrate, the solvent evaporates off and the hard, photochromic coating remains.

The order of the addition of the components to form our novel compositions is not critical and any method of blending may be utilized. It is preferred, however, that the resin portion of the compositions, i.e. the hydroxyl-containing polymer and the cross-linking agent, with or without the alcohol solvent, be added as one admixture to a solution of the transition metal halide. In this manner, the resultant composition may be prepared at the site of its use and then be coated on the substrate as a continuous film which crosslinks at room temperature to form a photochromic or valuable transmission device.

The thickness of the film which is coated on the self-supporting substrate is not critical and we have found that films ranging from about 0.5 mil to 3.0 mils are generally sufficient for practical purposes.

Any known material may be used as the self-supporting substrate to which our novel compositions are applied. The only criteria is that no foreign substance or impurity be present therein or thereon which would prevent direct contact of the coating with the substrate or would react in anyway with the coating. Such materials include wood, paper, metal, plaster, cement, plastic, cardboard, and the like. A preferred class of substrates are those materials which are transparent, such as quartz, mica and glass compositions, any number of which are known in the art and are now commercially available such as, for example, window glass, microscope, slide glass, high silica content glass and the like and also including transparent polymers such as poly(methyl methacrylate) and the like.

A further feature of our novel compositions resides in the fact that once they are coated onto the substrate and hardened, they may be washed with mild detergent solutions thereby enabling the use of the compositions as coatings for store windows, etc. which must, of necessity, be regularly washed.

It is understood that it is within the scope of our invention to coat an extraneous adhesive on the substrate before applying our novel compositions in order to obtain an even more tightly bonded coating. When such an adhesive is used, however, care must be taken to utilize an adhesive which is free of ultraviolet light absorbers since the use of such adhesive is critical if the photochromic effect of the coating is to be achieved. The use of extraneous adhesives is, however, not essential.

The following examples are set forth for purposes of illustration only and are not to be construed as limitations on the instant invention except as set forth in the appended claims. All parts and percentages are by weight unless otherwise specified.

EXAMPLE 1

A mixture is prepared by adding to a suitable reaction vessel, with agitation, 58.24% of a 60% solids alkyd resin (composed of 2000 parts of phthalic anhydride; 1365 parts of glycerol; 1311 parts of coconut oil fatty acid and 207 parts of cotton seed oil fatty acid), 11.65% of hexakismethoxy methyl melamine, 9.31% butanol as a solvent, and 0.46% of a commercially available silicone flow-control agent. To the resultant mixture is then added a solution of 3.39% of tungsten hexachloride in 16.95% of ethylene glycol monoethylether acetate solvent in a ratio of 4 parts of the alkyd resin mixture to 1 part of the hexachloride solution. The solids percent of the resultant solution is 48%. The viscosity, Ford 4 cup, is 22±2 sec. The Gardner Color (1933) is 10. The resultant composition is then flow-coated on double strength window glass to form a 1 mil film. When dry, the resultant coating is activated by placing it in contact with the rays of a mercury vapor arc light and the spectral transmission properties thereof are measured. The properties of the coating before and after contact with the mercury light are set forth in Table I, below.

TABLE I.—COATING OF EXAMPLE I

| | Transmission at 320 mμ | Transmission at 500 mμ | Transmission at 1,000 mμ |
|---|---|---|---|
| Clear (Before Contact) | 1% max | 88% max | 85% min |
| Blue (After Contact) | 1% max | 55% max | 5% max |

The fully activated film returns to 50% its initial clear condition, as measured by the Spectrocord, in 20 minutes.

EXAMPLE 2

To a suitable vessel are added 75 parts of the coconut oil alkyd of Example 1 and 25 parts of hexakismethoxymethyl melamine. To this mixture is then added 7.3% of tungsten hexachloride, based on the resin solids. When coated as a one mil film on glass and dried, the $\Delta D^1$ is 0.012. The $\Delta D^1$ is defined as the change in transmission density after 5 min. activation using a UVL–22—Blak/ray lamp as measured by the MacBeth Quantalog Densitometer with green filter (550 mμ).

Following the procedure of Example 2, various other hydroxy-containing resins are blended with various aminoplast cross-linking agents and transition metal halides to produce compositions according to the present invention. The transmission density change of each composition, while coated on glass, is set forth in Table II, below.

TABLE II

| Ex. | OH-Containing Polymer, Percent | Aminoplast Cross-Linking Agent, Percent | Transition Metal Halide, Percent | ΔD[1] |
|---|---|---|---|---|
| 3 | Epichlorhydrin-Bisphenol A reaction product (epoxide equivalent 1,550–2,000), 70%. | Hexakismethoxy-methyl-melamine, 30.0%. | Tungsten hexachloride, 7.30% | 0.06 |
| 4 | Styrene-allyl alcohol (1:1) copolymer-80%-phthalic anhydride (145 parts): soya bean fatty acid (12 parts): glycerol (101 parts): fumaric acid (3 parts) alkyd, 15%. | Hexakismethoxy-methyl-melamine, 5.0%. | ...do... | 0.10 |
| 5 | Cellulose acetate butyrate-65%: phthalic anhydride (50 parts): dimer fatty acids (20 parts); propylene glycol (20 parts); trimethylol ethane (10 parts) alkyd, 28%. | Hexakisemthoxy-methyl-melamine, 7.0%. | ...do... | 0.07 |
| 6 | Nitrocellulose, 65% same alkyd as Ex. 5, 28%. | ...do... | ...do... | 0.04 |
| 7 | Acrylic polymer, 67.5% (methylmethacrylate/butyl acrylate/β-hydroxyethyl-methacrylate=(78/6/16). | Hexakismethoxy-methyl-melamine, 32.5%. | ...do... | 0.09 |
| 8 | Mixture of 55% alkyd resin (19.5 parts glycerine; 25.2 parts castor oil; 7.9 parts soya oil; 15.2 parts soya fatty acid; 32.2 parts phthalic anhydride) and 45% styrene, 90%. | Hexakismethoxy-methyl-melamine, 10.0%. | ...do... | 0.06 |
| 9 | Alkyd resin composed of 35.6 parts of glycerine; 58.9 past dehydrated castor oil; 5.5 parts phthalic anhydride, 85%. | Hexakismethoxy-methyl-melamine, 15.0%. | ...do... | 0.12 |
| 10 | Alkyd resin composed of 26.6 parts glycerine; 33.7 parts soya fatty acids; 39.1 parts phthalic anhydride; 0.6 part fumaric acid, 85%. | ...do... | ...do... | 0.11 |
| 11 | Polyurethane resin composed of 15.7 parts toluenediisocyanate; 15.9 parts butanol; 68.1 parts of styrene-allyl-alcohol (1:1) copolymer, 81.4%. | Hexakismethoxy-methyl-melamine, 18.6%. | Tungsten hexachloride, 4.30% | 0.06 |
| 12 | Same as Ex. 1, 75% | Partially butylated melamine-formaldehyde resin-M/F ratio, 6/1, 25%. | Niobium pentachloride, 10.0% | 0.02 |
| 13 | Same as Ex. 3, 80% | Same as Ex. 1, 20% | Hafnium oxide dichloride, 20% | 0.04 |
| 14 | Same as Ex. 5, 90% | Same as Ex. 12, 10% | Vanadium oxide triiodide, 17% | 0.07 |
| 15 | Same as Ex. 9, 95.0% | N,N,N',N'-tetrakis(methoxymethyl)-2,6-diamino-4-phenyl-s-triazine, 5.0%. | Titanium oxide dichloride, 15% | 0.06 |
| 16 | Same as Ex. 4, 82.0% | Fully butylated urea formaldehyde (2:1) resin, 18%. | Zirconium tetrabromide, 10% | 0.09 |
| 17 | Same as Ex. 7, 82.0% | Di(ethoxymethyl) di(methoxymethyl) benzoquanamine, 18%. | Tantalum dichloride triethoxide, 12% | 0.10 |
| 18 | Same as Ex. 10, 50.0% | Melamine-formaldehyde resin (6/1), 50.0%. | Tungsten tetrabromide bis(p-toluate), 2.5% | 0.03 |
| 19 | Same as Ex. 8, 85.0% | Same as Ex. 1, 15.0% | Tantalum tetrachloride methoxide, 20% | 0.02 |
| 20 | Same as Ex. 3, 89.0% | Same as Ex. 3, 11.0% | Hafnium fluoride triphenoxide, 20% | 0.11 |
| 21 | Same as Ex. 6, 75.0% | Urea-formaldehyde (2:1) resin, 25% | Tungsten dibromide tetralaurate, 20% | 0.05 |

We claim:
1. A photochromic composition of matter consisting essentially of (1) an hydroxy-containing organic polymeric material selected from the group consisting of vinyl polymers, cellulosic polymers, polyester resins, oil modified alkyd resins, polyurethane resins, epoxy resins and epoxy resin esters, (2) from about 5% to about 50%, by weight, based on the total resin solids in said composition of, an aminoplast cross-linking resin and (3) from about 2.5% to about 20%, by weight, based on the total resin solids in said composition, of a metal halide having the formula

$$MX_mO_n(OR)_p$$

wherein M is a metal selected from the group consisting of titanium, zirconium, tungsten, hafnium, tantalum, vanadium, chromium and niobium, X is a halide, R is selected from the group consisting of an alkyl ($C_1$–$C_{12}$) radical, an aryl ($C_6$–$C_{10}$) radical and a

radical, $R^1$ is selected from the group consisting of an alkyl ($C_1$–$C_{12}$) radical and an aryl ($C_6$–$C_{10}$) radical, $m$ is a whole positive integer of 1–6, inclusive, $p$ is a whole positive integer of 0–5, inclusive, and $n$ is a whole positive integer of 0–2, inclusive, the total of $2n+m+p$ being equal to the valence of the metal M.

2. The composition of claim 1, having in addition thereto, (4) an aliphatic alcohol.

3. A composition according to claim 1 wherein (3) is tungsten hexachloride.

4. A composition according to claim 1 wherein (3) is niobium pentachloride.

5. A composition according to claim 1 wherein (2) is an alkylated melamine-formaldehyde resin.

6. A composition according to claim 1 wherein (1) is an alkyd resin.

7. A composition according to claim 1 wherein (2) is hexakismethoxymethyl melamine.

8. A composition according to claim 1 wherein (2) is hexakismethoxymethyl melamine and (3) is tungsten hexachloride.

9. An article of manufacture comprising a self-supporting, inert substrate coated with the composition of claim 1.

10. An article of manufacture comprising glass coated with the composition of claim 1 wherein (2) is hexakismethoxy methyl melamine and (3) is tungsten hexachloride.

References Cited

UNITED STATES PATENTS

| | | | |
|---|---|---|---|
| 2,895,892 | 7/1959 | Chalkley | 350—160 X |
| 3,236,651 | 2/1966 | Marks et al. | 350—160 X |
| 3,293,037 | 12/1966 | Chopoorian | 350—160 X |

LEON D. ROSDOL, *Primary Examiner.*

RICHARD D. LOVERING, *Assistant Examiner.*